(12) United States Patent
Dillon et al.

(10) Patent No.: US 6,206,237 B1
(45) Date of Patent: Mar. 27, 2001

(54) BOTTLE DISPENSER

(75) Inventors: Mike Dillon, Norwalk, CT (US);
Gerard A. Furbershaw, Menlo Park, CA (US); Robert A. Howard, Palo Alto, CA (US); David W. Laituri, Palo Alto, CA (US); Adam K. McGinty, Palo Alto, CA (US); Brad Melmon, San Francisco, CA (US); Robert C. Meyer, Wilton, CT (US); Miguel M. L. Praca, San Francisco, CA (US); Arthur G. Sandoval, Foster City, CA (US); Jeffrey L. Smith, San Mateo, CA (US); Dayne Wilcox, Palo Alto, CA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 09/263,079

(22) Filed: Mar. 8, 1999

(51) Int. Cl.⁷ .............................. B65G 59/00; B65H 3/30; G07F 11/16
(52) U.S. Cl. ..................... 221/289; 221/193; 221/312 R
(58) Field of Search ................................... 221/130, 109, 221/193, 194, 195, 205, 289, 312 R, 90, 152, 281, 295

(56) References Cited

U.S. PATENT DOCUMENTS

| | | | |
|---|---|---|---|
| 2,562,015 | * | 7/1951 | Cattanach .................... 221/109 X |
| 2,852,327 | * | 9/1958 | Mason ......................... 221/194 X |
| 2,996,344 | * | 8/1961 | Garman ........................... 221/193 |
| 3,141,571 | * | 7/1964 | Moore .......................... 221/194 X |
| 3,464,589 | * | 9/1969 | Oden ................................ 221/90 |
| 3,938,700 | * | 2/1976 | Camp et al. .................. 221/109 X |
| 4,485,937 | * | 12/1984 | Adams ............................ 221/129 |
| 4,763,963 | * | 8/1988 | Lauffer et al. ............... 221/281 X |
| 4,986,441 | * | 1/1991 | Kanbe et al. .................... 221/130 |
| 5,199,598 | * | 4/1993 | Sampson ...................... 221/194 X |
| 5,462,198 | * | 10/1995 | Schwimmer ..................... 221/130 |
| 5,829,630 | * | 11/1998 | Fernald ........................ 221/281 X |

* cited by examiner

*Primary Examiner*—Christopher P. Ellis
*Assistant Examiner*—Gene O. Crawford
(74) *Attorney, Agent, or Firm*—Fitzpatrick, Cella, Harper & Scinto

(57) ABSTRACT

A dispenser sequentially dispenses a plurality of containers. The dispenser includes a housing having a front, a rear, a top, a bottom, a first side and a second side, with an inlet and an outlet for the containers being disposed on its front. A passage is disposed within the housing and guides the containers from the inlet to the outlet. A receiving door is connected to the housing and is movable between a closed position covering the inlet and an open position allowing the containers to be inserted into the inlet. The receiving door includes a front face contoured to cooperate with the passage to guide the containers to a predetermined orientation upon insertion into the inlet. The passage is also canted toward one side of the housing to maintain the containers in the predetermined orientation.

57 Claims, 9 Drawing Sheets

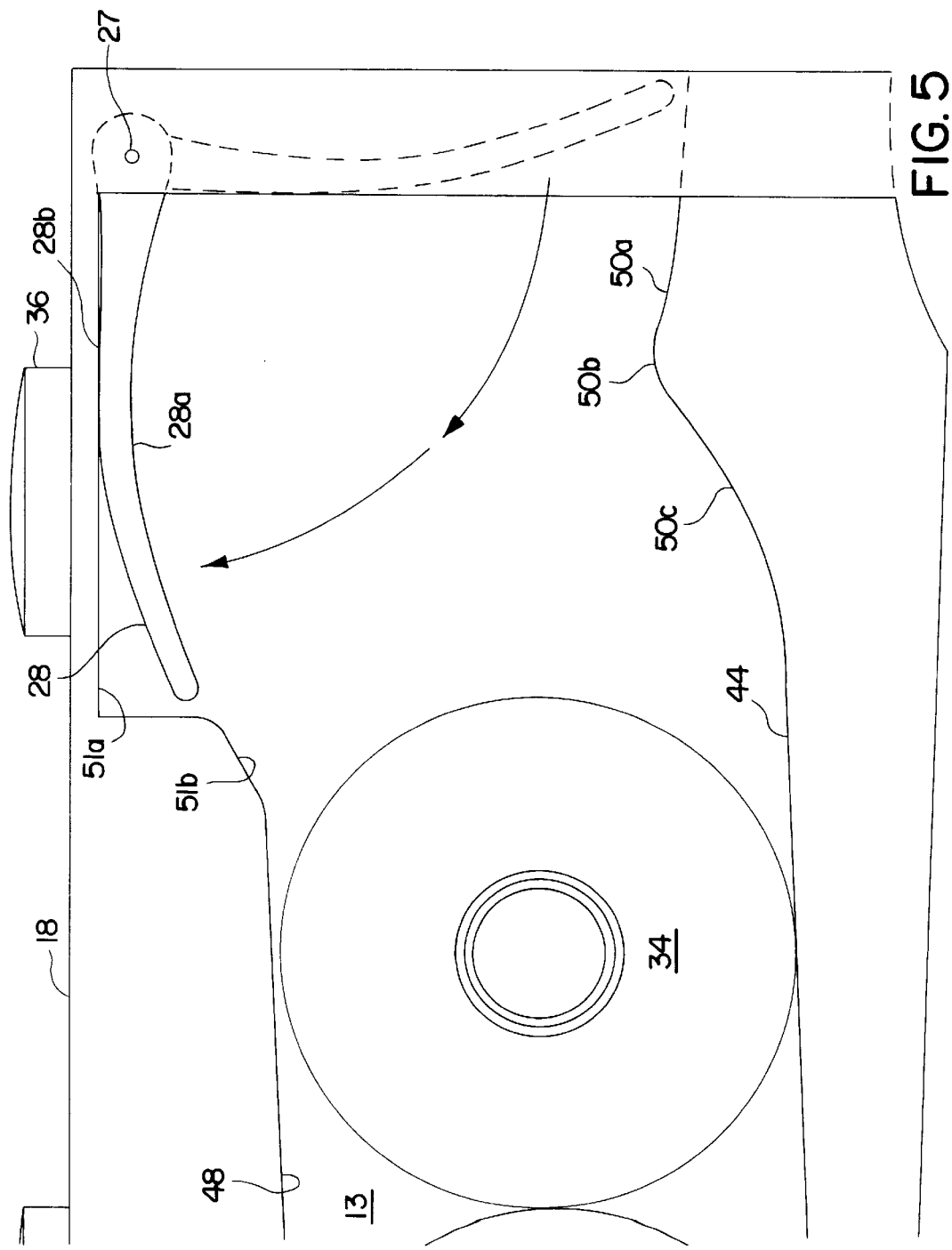

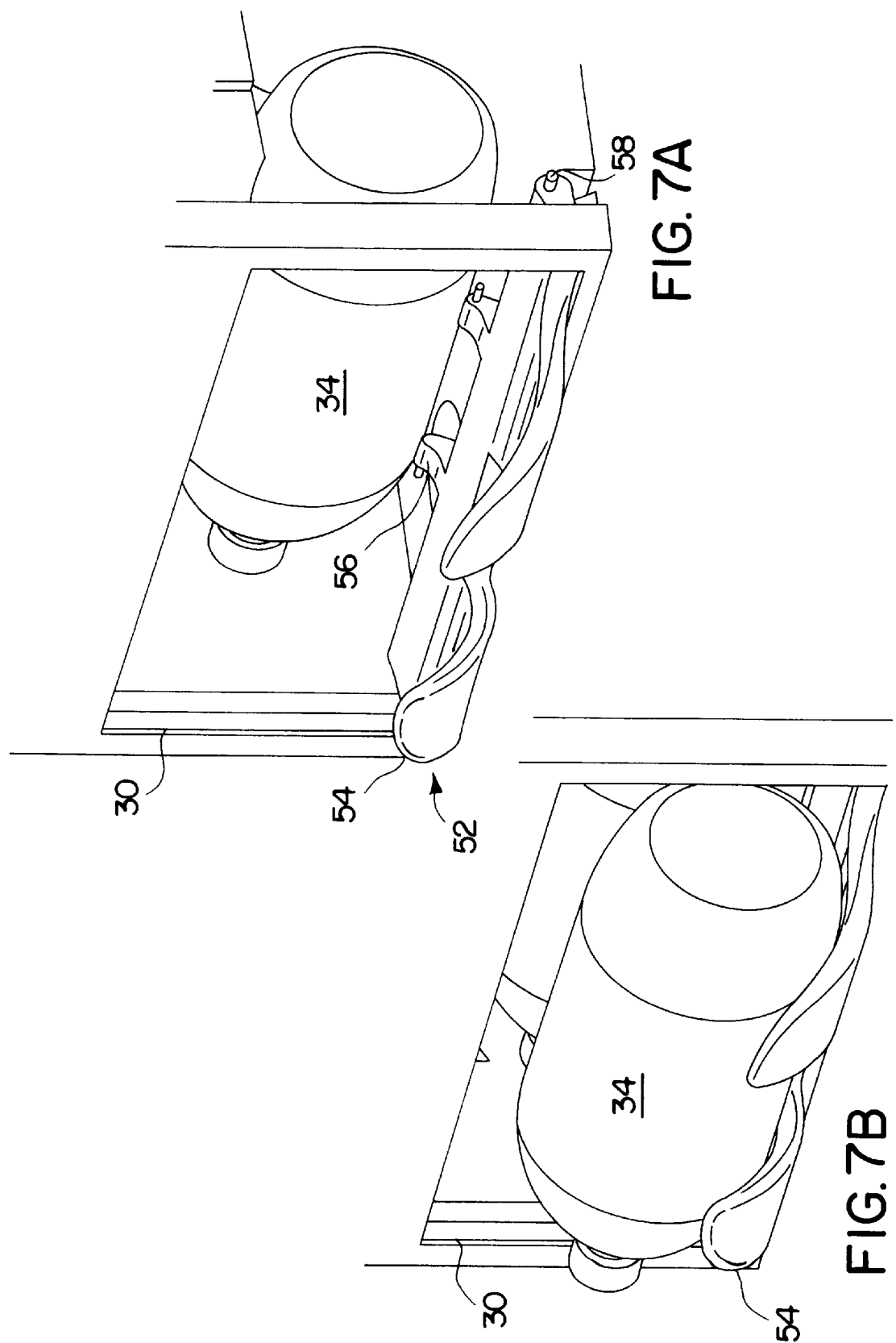

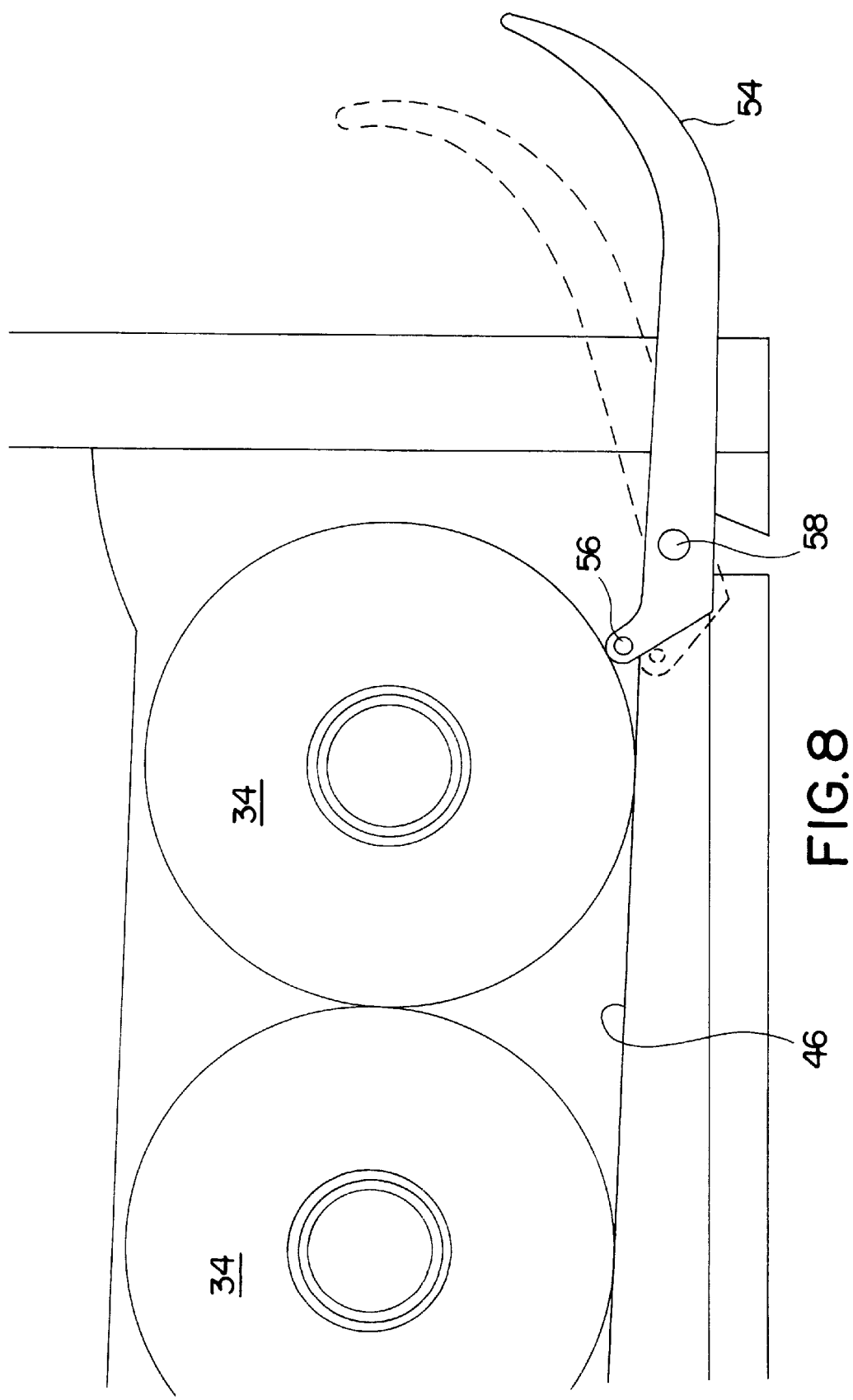

BOTTLE DISPENSER

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a dispenser for containers, and more particularly to a dispenser for cylindrical containers, such as bottles, having a sloped guide track for automatically dispensing stored bottles while preventing them from skewing on the track and limiting shock between the bottles themselves and between the bottles and the track. The present invention also relates to a dispenser formed of modular components that can be assembled into various shapes and sizes.

2. Description of the Related Art

Containers such as two-liter beverage bottles or other types and sizes are typically shipped in trays or shipping crates, and are loaded manually onto a display rack, shelving unit or refrigeration display unit at grocery stores or convenience stores for sale.

Several container dispensers for automatically dispensing containers by gravity feed are known. In a typical dispenser, the containers are supplied from the rear of the dispenser and slide down a linear track due to gravity in order to be dispensed from the front of the dispenser. In one dispenser of this type, the containers are vertically-oriented with their bottoms sliding along the track, and in another the containers are horizontally-oriented and roll down the track.

However, such conventional dispensers have many drawbacks. For example, each dispenser must have a considerable length in order to stock an adequate supply of containers. That is, the length of each track of the dispenser must be at least as long as the cumulative diameters of the stocked containers and the depth of the dispenser is almost as long as its tracks, depending on the angle of the tracks. Also, because such a dispenser is stocked from the rear of the dispenser, access to the rear must be available, which could require even more space or require the dispenser to be temporarily moved to provide adequate space when stocking.

Further, if the containers are supplied vertically, as they are individually placed on and slide down the track, they could topple. On the other hand, horizontally-oriented containers can skew while sliding down the track, especially if they are not properly oriented at the time they are loaded into the dispenser. Proper orientation is defined as the cylindrical axis of the container being disposed substantially orthogonal to the conveyance direction. Skewing is also prone to occur when the container is rolling and an end contacts a side wall of the track. Friction caused by the end rubbing the sidewall tends to skew the container. This is especially true with bottles if their neck ends contact the sidewall. These incidents of skewing can lead to jamming along the dispenser track.

When one container is pulled out of the dispensing end of a typical dispensing unit, the next container in line slides or rolls due to gravity into a dispensing position defined by a stop. The remaining containers simultaneously slide down and are abruptly halted when the leading container hits the stop. The resulting impact or shock between the lead container and the stop and between the containers themselves results in unwanted jostling of the containers and can cause movement of the dispenser itself. The forces on the containers can cause damage and can even force the lead container out of the dispenser.

BRIEF SUMMARY OF THE INVENTION

It is, therefore, an object of the present invention to provide a dispensing unit for storing, displaying and dispensing containers at a point of sale.

Another object of the present invention is to provide a dispensing unit that can be stocked and dispensed from the same side of the unit.

It is another object of the present invention to provide a dispensing unit configured for front-loading and front-dispensing, and which receives and dispenses the containers in a horizontal position.

Still another object of the present invention is to provide a dispensing unit that can aid a user in correctly orienting the containers as they are fed into the unit.

Yet another object of the present invention is to provide a dispensing unit that maintains the containers in their desired orientation throughout their travel.

A still further object of the present invention is to provide a dispensing unit that can sequentially dispense individual containers one at a time.

Yet a further object of the present invention is to provide a dispensing unit that prevents unwanted shock or skewing of the containers throughout their travel.

Still another object of the present invention is to provide modular container dispenser units that can be readily stacked and interlocked vertically and horizontally.

According to one aspect of the present invention a dispenser sequentially dispenses a plurality of containers. The dispenser includes a housing, a passage and a receiving door. The housing has a front, a rear, a top, a bottom, a first side and a second side, while an inlet and an outlet for the containers are disposed on the front of the housing. The passage is disposed within the housing for guiding the containers from the inlet to the outlet. The receiving door is connected to the housing for openably covering the inlet. The receiving door is movable between a closed position covering the inlet and an open position allowing the containers to be inserted into the inlet. The receiving door includes a front face contoured to cooperate with the passage to guide the containers in a predetermined orientation upon insertion into the inlet.

According to another aspect of the present invention a dispenser, which sequentially dispenses a plurality of containers, includes a housing and a passage. The housing has a front, a rear, a top, a bottom, a first side and a second side, with an inlet and an outlet for the containers being disposed on the front of the housing. The passage is disposed within the housing for guiding the containers from the inlet to the outlet. The passage comprises at least one ramp having a downward slope for guiding the containers from the inlet to the outlet of the housing. The at least one ramp is canted downwardly from the first to the second side of the housing to urge the containers toward the first side of the housing.

According to a further aspect of the present invention a dispenser, which sequentially dispenses a plurality of containers, includes a housing, first and second ramps and a U-turn section. The housing has a front, a rear, a top, a bottom, a first side and a second side, with an inlet and an outlet for the containers being disposed on the front of the housing. The first ramp is disposed within the housing and is angled downwardly from the inlet toward the rear of the housing. The second ramp is disposed within the housing and is angled downwardly from the rear toward the outlet of the housing. The U-turn section is disposed between the first and second ramps, is of a semi-circular shape, and is formed contiguously with the second ramp. Each of the containers has a cylindrical sidewall of a predetermined diameter, and a minimum distance between the first ramp and the U-turn section is slightly greater than the predetermined diameter.

According to yet another aspect of the present invention, a dispenser, which sequentially dispenses a plurality of containers, includes a housing, a passage, a gate and a container cradle. The housing has a front, a rear, a top, a bottom, a first side and a second side, with an inlet and an outlet for containers being disposed on the front of the housing. The passage is disposed within the housing for guiding the containers from the inlet to the outlet. The gate is disposed at the outlet of the housing and is movable between a first position blocking the containers from exiting the housing and a second position allowing the containers to exit the housing through the outlet. The container cradle is disposed outside of the housing adjacent the outlet and is interconnected with the gate. When a container is disposed on the container cradle, the gate is held in the first position to prevent another container from moving onto the container cradle and when no container is present on container cradle, the gate is not held in the first position to allow a container to exit the outlet onto the container cradle.

According to still another aspect of the present invention, a dispenser, which sequentially dispenses a plurality of containers, includes a housing, a passage and receiving means. The housing has a front, a rear, a top, a bottom, a first side and a second side, with an inlet and an outlet for the containers being disposed on the front of the housing. The passage is disposed within the housing for guiding the containers from the inlet to the outlet. The receiving means is connected to the housing and receives containers through the inlet and guides the containers in a predetermined orientation.

According to still a further aspect of the present invention, a dispenser, which sequentially dispenses a plurality of containers, includes a housing, a passage and guiding means. The housing has a front, a rear, a top, a bottom, a first side and a second side, with an inlet and an outlet for the containers being disposed on the front of the housing. The passage is disposed within the housing for guiding the containers from the inlet to the outlet. The guiding means is disposed within the housing and maintains the containers in a predetermined orientation while the containers move along the passage from the inlet to the outlet.

The above, and other objects, features and advantages of the present invention will be apparent from the following detailed description of illustrative embodiments thereof, which is to be read in connection with the accompanying drawings wherein:

BRIEF DESCRIPTION OF THE DRAWINGS

FIG. 5 is an enlarged cross-sectional view of the inlet section and receiving door of the dispenser unit of the present invention;

FIG. 7A and FIG. 7B are partial perspective views of the outlet section and dispensing tray of the dispenser unit of the present invention;

FIG. 8 is an enlarged cross-sectional view of the outlet section and dispensing tray of the dispenser unit of the present invention.

DETAILED DESCRIPTION OF THE INVENTION

Figure 1:
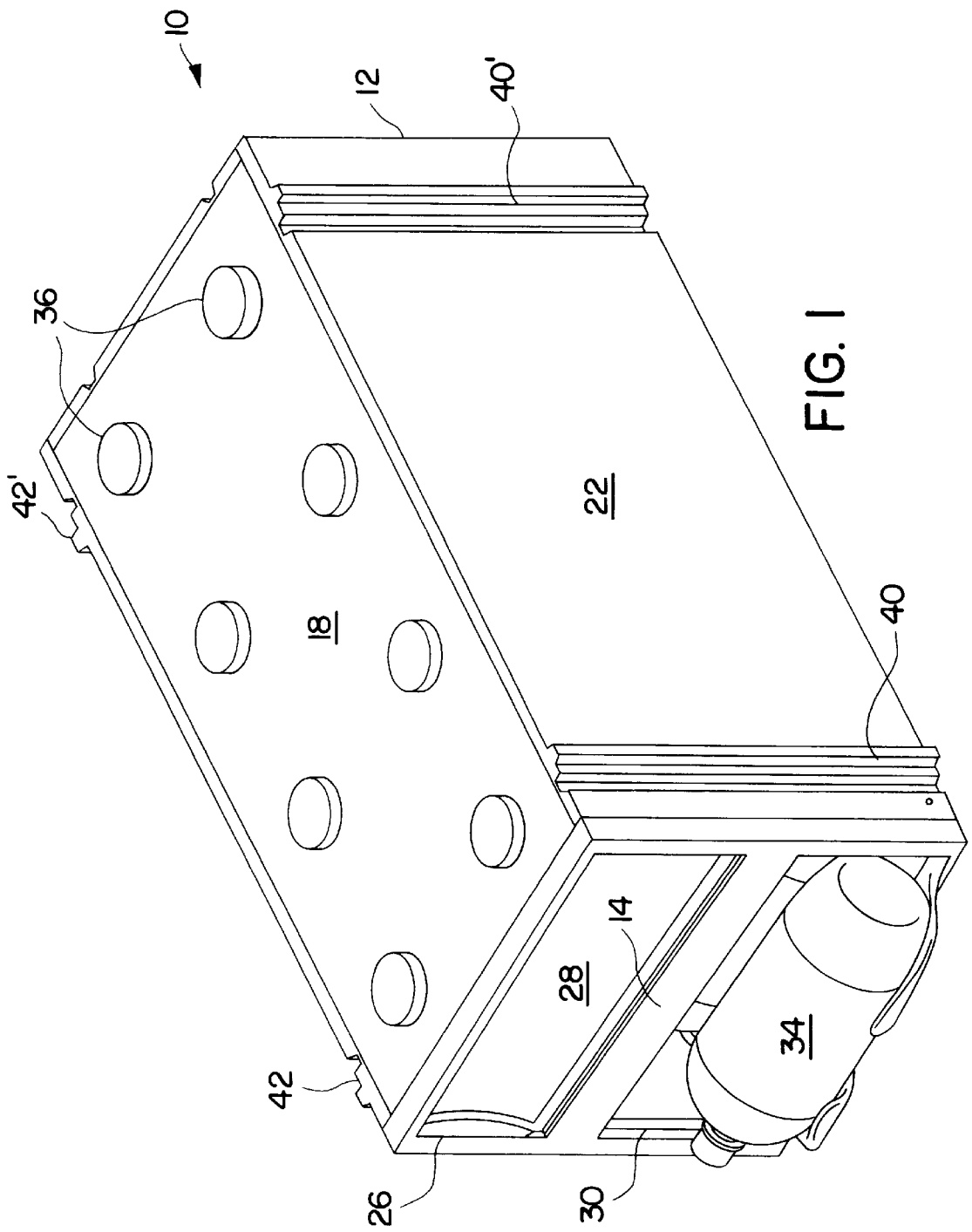
FIG. 1 is a top perspective view of the container dispenser unit of the present invention.

Referring now to the drawings in detail, the container dispensing unit 10 constructed in accordance with the present invention is illustrated.

Figure 2:
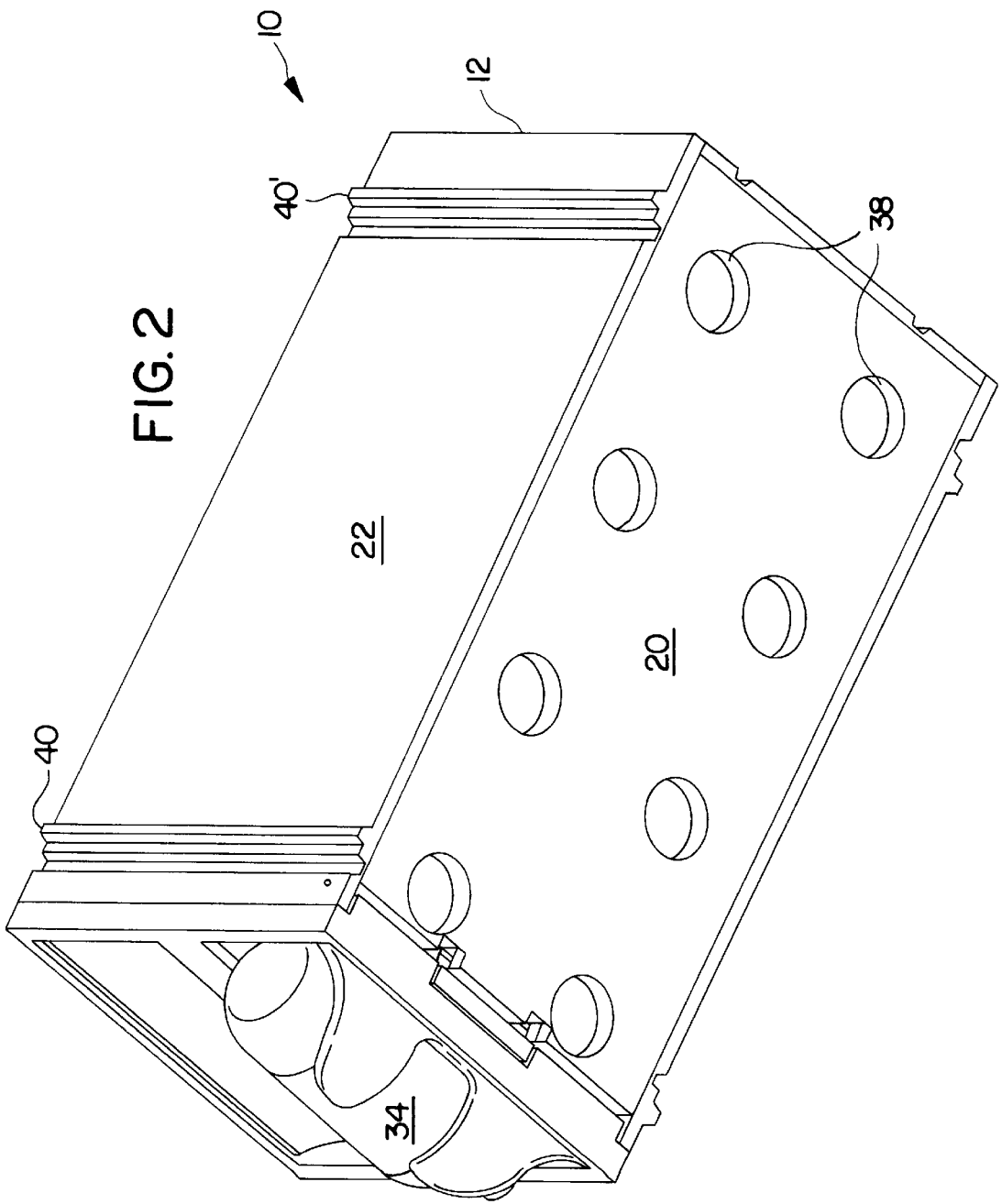
FIG. 2 is a bottom perspective view of the dispenser unit according to the present invention.
Figure 3:
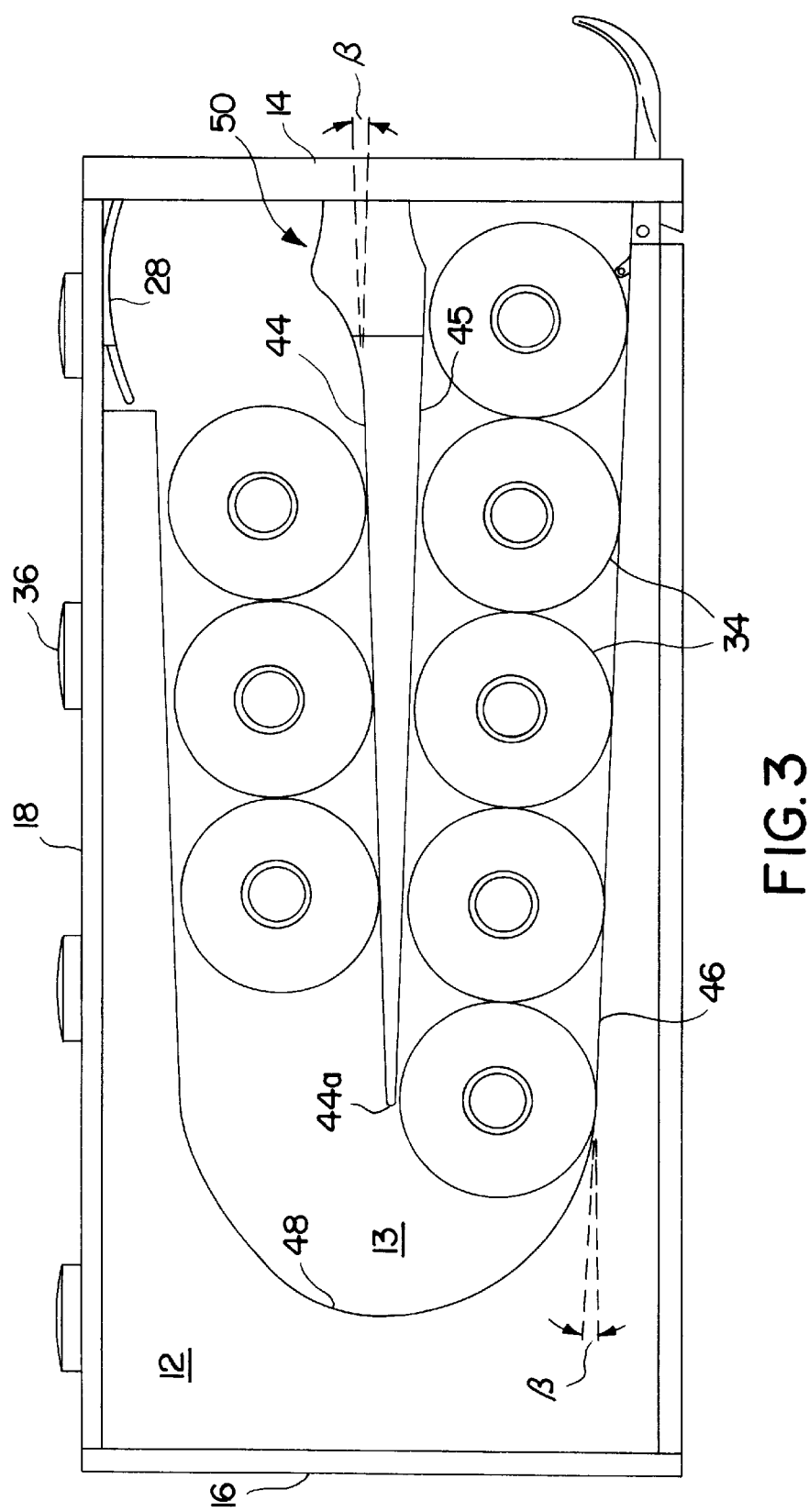
FIG. 3 is a full cross-sectional view of the dispenser unit of the present invention.
Figure 6:
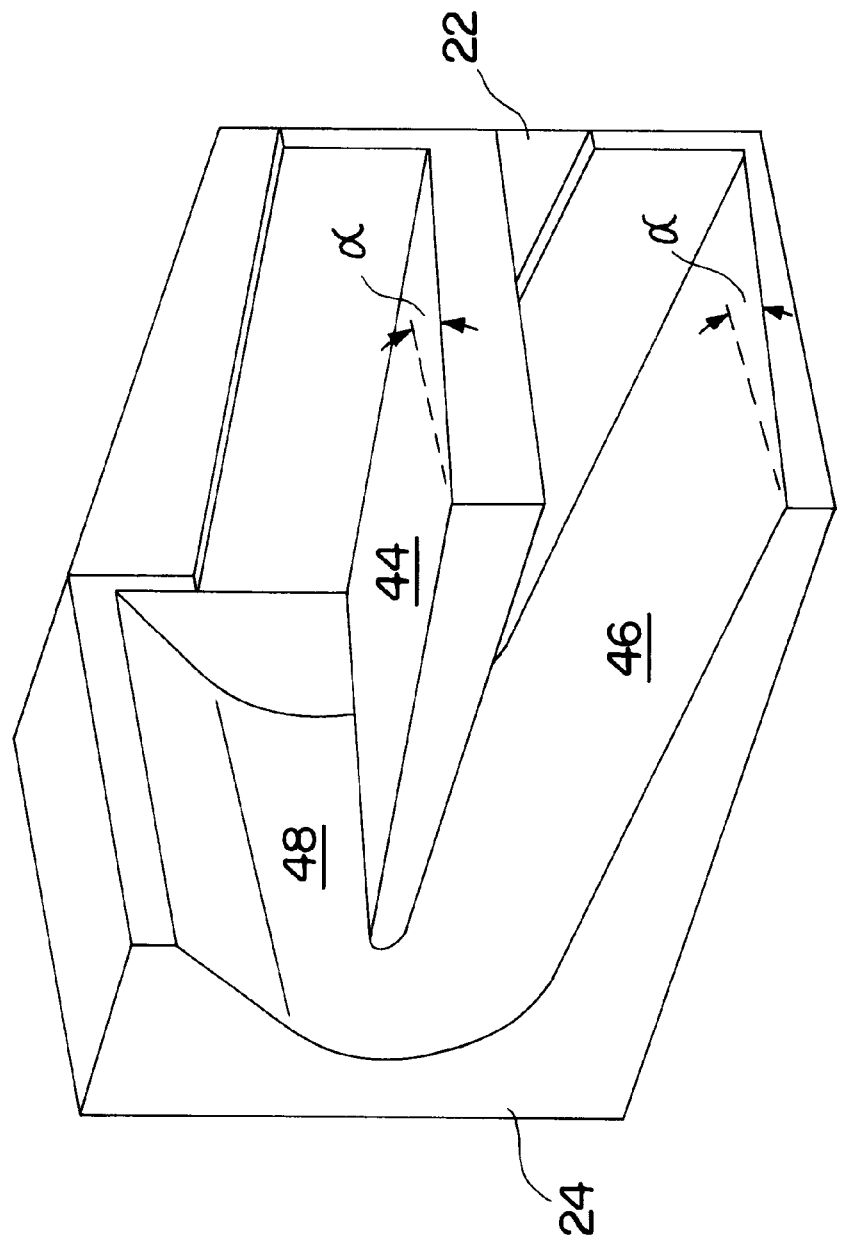
FIG. 6 is a partially broken-away perspective view of the dispenser unit of the present invention.

As shown in FIGS. 1 to 3, the dispensing unit 10 includes a housing 12 having a front face 14, a rear face 16, a top 18, a bottom 20, a right side 22 and a left side 24 (see FIG. 6). Front face 14 of housing 12 includes an inlet or entrance 26 and an outlet or exit 30. An inlet and receiving door 28 is hinged to the container so as to selectively cover and expose inlet 26.

Housing 12 is of a modular design and includes a series of interlocking plugs 36 disposed on top face 18 and complementary interlocking receptacles 38 disposed on or formed in bottom face 20. In addition, a pair of interlocking grooves and projections 40, 40' are disposed on right side 22 and complementary grooves and projections 42, 42' are disposed to extend along left side 24. With these interlocking features, several dispensing units 10 can be securely stacked one on top of another with interlocking recesses 38 of a lower dispenser unit engaging interlocking projections 36 of an upper dispenser unit. Similarly, several dispensing units 10 can be securely engaged side-by-side with interlocking grooves and projections 40, 40' of one unit engaging interlocking grooves and projections 42, 42' of an adjacent unit. Due to this modular design, several dispensing units can be arranged in various shapes and sizes in order to fully utilize available floor space. In addition, because each unit 10 can store different brands of containers, if several units are stacked one upon the other then multiple brands can be dispensed in a single column.

Referring to FIG. 3, a multi-level conveyance path or track 13 for conveying horizontally-disposed containers is located internally of housing 12. The conveyance track 13 includes an upper ramp 44 and a lower ramp 46, each of which is slightly wider than the height of a typical container. Ramps 44 and 46 have a slope β; ramp 44 is angled downwardly toward the rear of dispensing unit 10 and ramp 46 in angled downwardly away from the rear of dispensing unit 10. The slope β can be any desired angle to effect gravitational feed of the containers. However, if the slope β is too great the containers will roll too fast and if too small they may stall. Preferably the slope β ranges from 3 to 10°.

The containers are gravitationally fed down upper ramp 44 to lower ramp 46 by way of a U-turn section 48. U-turn section 48 preferably forms a ceiling of conveyance track 13 above upper ramp 44 and is contiguous with lower ramp 46.

A bottom surface 45 of upper ramp 44 forms the ceiling of the conveyance track above lower ramp 46. With the U-turn configuration of conveyance path 13, numerous containers can be stored in a compact space. In a preferred embodiment, the track and housing are dimensioned to hold 12 two-liter bottles, for example.

Ramps 44, 46 and U-turn section 48 can be integrally formed with housing 12. Alternatively, any one of the foregoing elements can be formed as an individual component and be assembled within the housing. Housing 12, ramps 44, 46 and U-turn section 48 are preferably formed of a lightweight yet sturdy material. For example, they can be formed of injection-molded polypropylene or polyethylene. Other rigid materials such as cardboard and metal are also within the scope of this invention. It is preferred that each dispenser unit 10 be sturdy enough to support the weight of several other fully-loaded units stacked on it.

In use, containers such as two-liter bottles 34 are individually fed into inlet 26 in a horizontal position and roll down upper ramp 44 toward the rear of housing 12, then the bottles reverse direction at U-turn section 48 and roll down lower ramp 46 toward the front of housing 12 to outlet 30. It is important, however, that the bottles 34 are not skewed as they roll in the conveyance path 13 so they do not jam and block the smooth dispensing flow of the bottles. This is prevented by maintaining the bottles in their proper orientation throughout their travel. That is, the longitudinal axes of the bottles 34 should always be substantially orthogonal to the conveyance direction along conveyance path 13. To accomplish this, the display unit of the present invention is provided with several anti-skewing features.

Figure 4A:
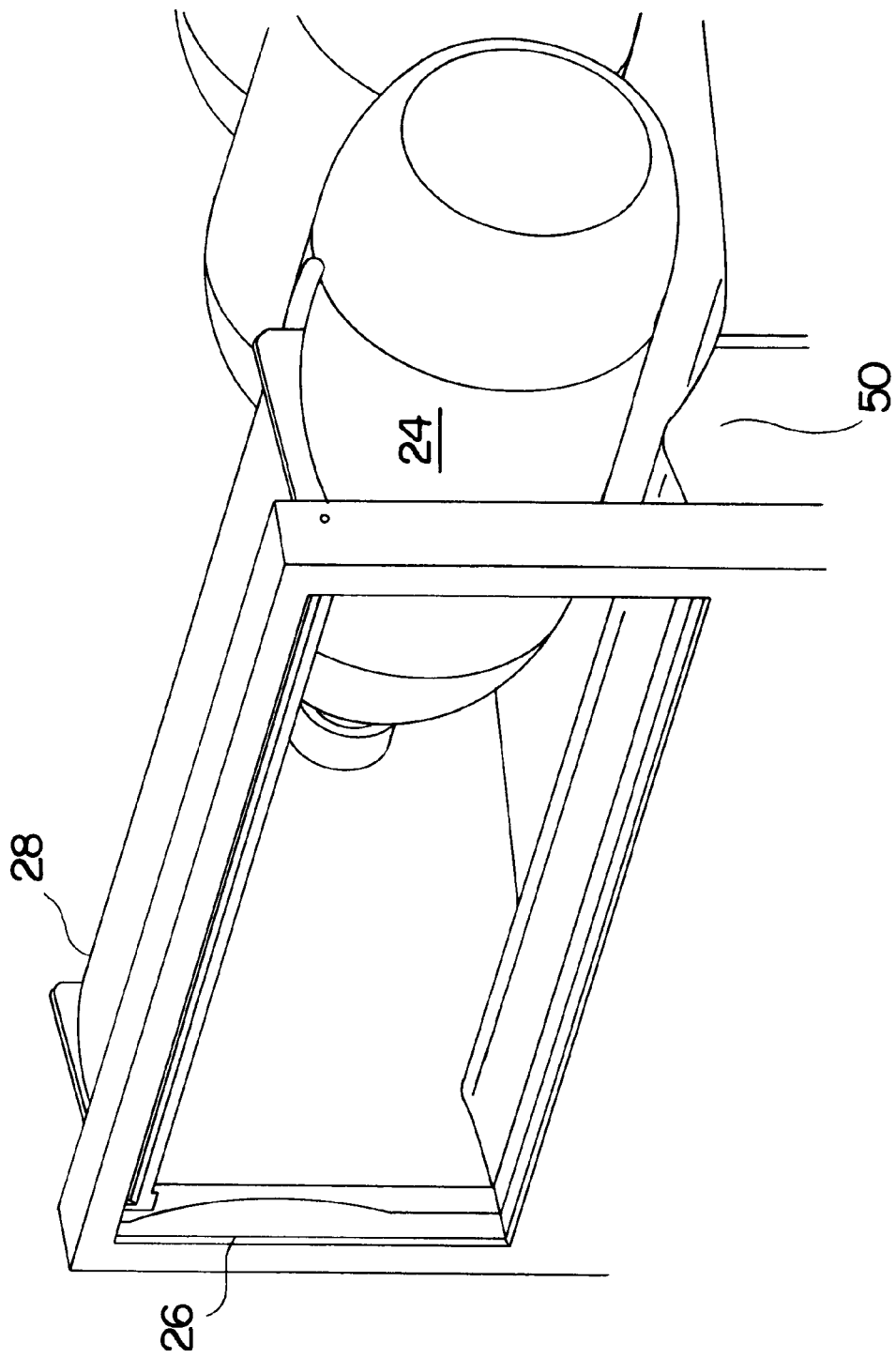
FIG. 4A is an enlarged perspective view of the inlet section and receiving door of the dispenser unit of the present invention.

When stocking dispensing unit 10, it is important that the containers be inserted into inlet 26 in their proper orientation to prevent such skewing. This is assisted by a combination of receiving door 28 and a contoured surface 50 of upper ramp 44, which are disposed at an inlet section of housing 12 adjacent inlet 26. As shown in more detail in FIGS. 4A and 5, receiving door 28 is hinged or pivotally mounted on housing 12 at pivot points 27. It has a concave receiving face 28a and is swingable between a closed position (shown in phantom in FIG. 5) to a fully open position (shown in solid in FIG. 5). The fully open position is limited by the rear surface 28b of receiving door 28 abutting a face of a recess 51a of housing 12. In the fully open position, receiving face 28a forms the ceiling of conveyance path 13 at the inlet section. Housing 12 also has a transition edge 51b to transition the ceiling of conveyance path 13 from receiving face 28a to the ceiling of U-turn section 48.

Contoured surface 50 of upper ramp 44 includes a first concave section 50a, a convex section or protrusion 50b and a concave transition section 50c in the order of conveyance. Each of the sections of contoured surface 50 preferably extends the full width of the upper ramp 44. As a bottle 34 or other container is inserted in inlet 26, it will first roll on concave section 50a and be momentarily stopped by convex protrusion 50b. The minimum distance between convex protrusion 50b and concave face 28a of receiving door 28 (when in its fully open position) is slightly greater than the typical diameter of a container to be stocked (e.g., the typical diameter of a two-liter beverage bottle). As the container 34 is further urged over convex protrusion 50b, its central axis must be substantially orthogonal to the conveyance direction or else it will not fit between convex protrusion 50b and concave face 28a. In other words, the container must be substantially parallel to protrusion 50b. This ensures that the user properly orients each container when stocking. After each container is urged over protrusion 50b, it rolls down transition section 50c and continues down upper ramp 44.

Even if containers 34 are properly oriented upon insertion, they may still tend to skew as they travel down the ramps, especially if an end of a container rubs against an inner sidewall of housing 12. This is especially true when the neck end of a bottle comes into contact with a sidewall. To counter this tendency, another anti-skewing feature of the present invention maintains the supplied containers or bottles in the desired orientation throughout conveyance.

As shown more clearly in FIG. 6, the upper surfaces of both top ramp 44 and bottom ramp 46 not only are sloped toward or away from the rear of dispenser unit 10 at a slope $\beta$, but they are also canted or tilted toward one side of housing 12. In the illustrated embodiment, the ramps are canted downwardly toward right side 22 of housing 12 at an angle $\alpha$. In one embodiment, this canting is continuous throughout conveyance path 13, including U-turn section 48. That is, an imaginary central axis of curvature of U-turn section 48 is also canted at the angle $\alpha$. Alternatively, U-turn section can be formed without being canted or can be formed in a partially-conical shape.

With this construction, as containers roll down ramp 44, around U-turn section 48 and down ramp 46, they will be urged by gravity not only in the conveyance direction, but also toward the right side of the housing. Thus, the right ends of the containers are urged against the right sidewall of conveyance path 13.

Although angle $\alpha$ can be of any sufficient angle to urge the containers toward the right, an angle too great would cause too much friction between the right ends of the containers and the sidewall, thus preventing the containers from rolling. An insufficient angle $\alpha$ would not be effective in urging the containers toward the right side. Preferably, $\alpha$ ranges from 3 to 10°.

Figure 4B:
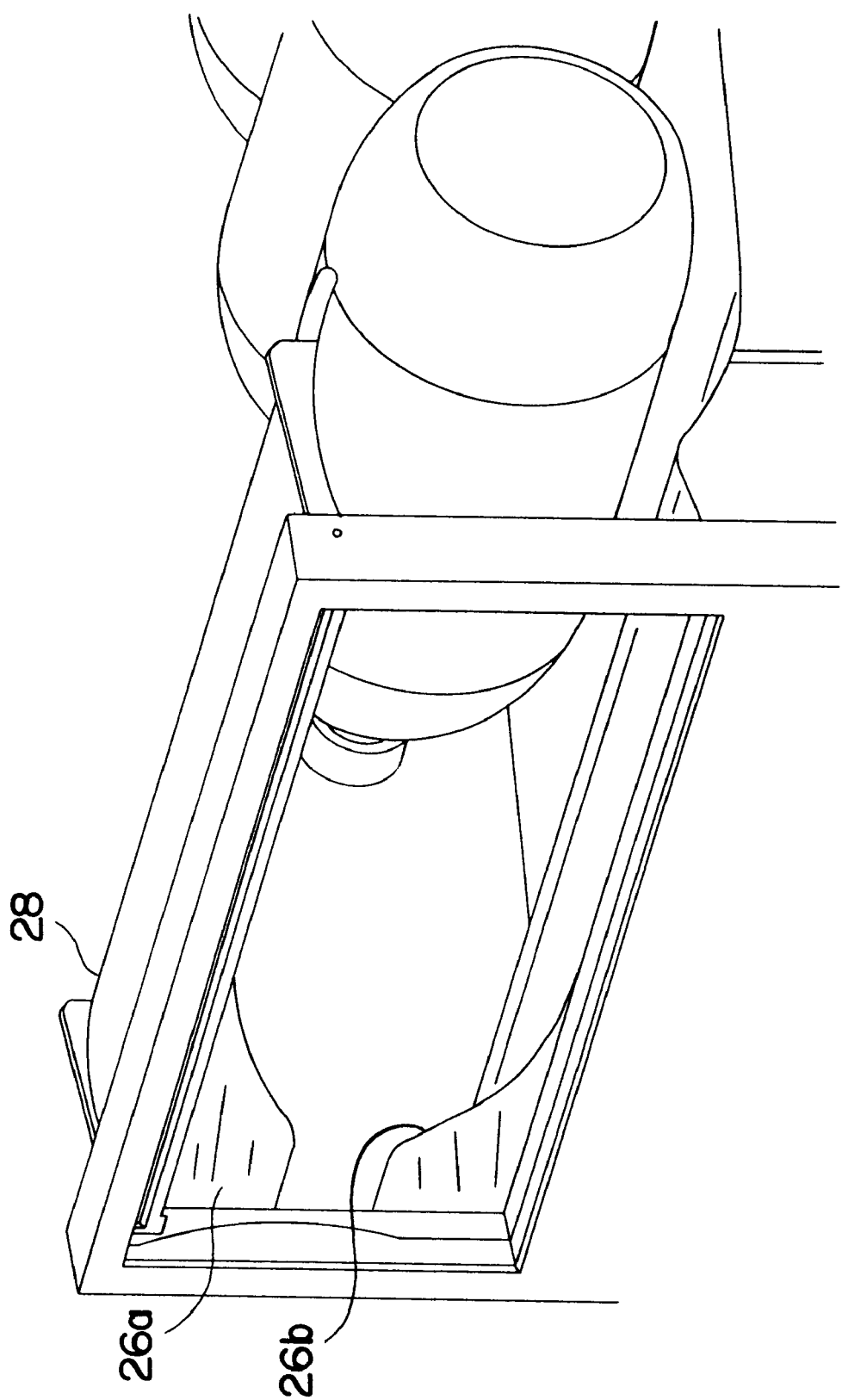
FIG. 4B is an enlarged perspective view of a modified inlet section of the dispenser unit of the present invention.

In the event that bottles are placed in the dispensing unit, their bottoms are preferably disposed toward right side 22 of the housing with their neck ends toward left side 24. This will prevent the neck ends from coming into contact with the side of the housing as the bottles roll down conveyance path 13, thus assisting in preventing skewing of the bottles during conveyance. In order to aid in loading the bottles consistently with their neck ends toward the left side, a label or other indicia depicting the desired bottle orientation can be positioned near inlet 26 of housing 12 for reference by a user. Alternatively, the desired orientation can be ensured by positioning a key at inlet 26. As shown in FIG. 4B, the key can be in the form of a plate 26a with a cutout 26b having a shape and size slightly larger than the bottles to be stocked. It can be secured in the inlet in any convenient manner. Thus, the bottles can only be inserted in inlet 26 in one orientation: horizontally with their neck end facing the left side of housing 12.

It is also important during conveyance of containers to minimize shocks or impacts, which can damage the containers and cause the contents of carbonated beverage containers to over-pressurize. Accordingly, it is preferred that there be a smooth transition as the containers roll from top ramp 44 to bottom ramp 46. Thus, U-turn section 48 is designed to have a semi-circular surface having a radius of curvature slightly larger than the typical diameter of the container to be dispensed. As noted previously, the central axis of U-turn section 48 is canted at the angle $\alpha$ to maintain the containers in their proper orientation throughout the U-turn and aid in the smooth transition. In addition, at its closest, the distance between edge 44a of top ramp 44 and U-turn section 48 is slightly larger than the typical diameter of the containers. Thus, as a bottle or container 34 rolls down upper ramp 44, it will transition into contact with U-turn section 48a and smoothly roll onto lower ramp 46. That is, the containers will not drop from upper ramp 44 directly onto lower ramp 46.

Referring to FIGS. 7A, 7B and 8, the outlet section of dispensing unit 10 now will be described. Stocked containers are dispensed one at a time out of dispensing unit 10 by a metering mechanism 52. Metering mechanism 52 comprises a cradle 54 and gate 56, which can be formed integrally. Metering mechanism 52 is hinged to housing 12 at outlet 30 by integral pivot pins 58 at its opposite ends. Cradle 54 has longer moment arm about pivots 58 than that of gate 56. As containers 38 emerge from outlet 30, they come to rest on cradle 54, which holds and displays one container at a time in a horizontal position for the consumer. As described below, when a bottle is resting on cradle 54, gate 56 prevents the force from the weight of the remaining containers in conveyance path 13 from pressing against the displayed container and forcing the displayed container out of cradle 54.

When no containers are in display unit 10, metering mechanism 52 is in a rest position shown in solid lines in FIG. 8 because of the longer moment arm of cradle 54. After an inserted container rolls down lower ramp 46 near outlet 30, it rolls onto gate 56, forcing it downward, thus rotating the metering mechanism to the dotted line position. The container then rolls over gate 56 and onto cradle 54. The weight of the container on cradle 54 pivots the cradle downwardly back to the solid line position thereby returning gate 56 to its original position. When the next container in line rolls down ramp 46, it cannot roll over gate 56 because it cannot overcome the weight of the displayed container acting on the longer effective moment arm of cradle 54. Thus, the next container in line is stopped by gate 56 and will not impact against the displayed container in cradle 54. When the container in cradle 54 is removed, the next bottle in line can then force gate 56 downwardly and roll over the gate onto cradle 54.

With the above arrangement, bottles or containers to be displayed can be inserted into the dispensing unit in a proper orientation and can be conveyed through the dispensing unit without skewing. Also, the containers smoothly roll through the dispensing unit with minimal shock or impact. Further, the containers can be metered out one at a time without displayed containers being forced out of the cradle.

Although illustrative embodiments of the present invention have been described herein in connection with the accompanying drawings, it is to be understood that this invention is not limited to those precise embodiments and that various changes and modifications may be effected therein by those skilled in the art without departing from the spirit of the invention.

We claim:

1. A dispenser for sequentially dispensing a plurality of containers, said dispenser comprising:
    a housing having a front, a rear, a top, a bottom, a first side and a second side, an inlet and an outlet for the containers being disposed on the front of said housing;
    a passage disposed within said housing for guiding the containers from the inlet to the outlet; and
    a receiving door connected to said housing for openably covering the inlet, said receiving door being movable between a closed position covering the inlet and an open position allowing the containers to be inserted into the inlet, wherein said receiving door includes a front face contoured to cooperate with said passage to guide the containers in a predetermined orientation upon insertion into the inlet.

2. A dispenser according to claim 1, wherein said front face of said receiving door is a concave shape.

3. A dispenser according to claim 1, wherein said housing comprises locking means for interconnecting with adjacent housings of other dispensers.

4. A dispenser according to claim 1, wherein said front face of said receiving door is a concave shape and a surface of said passage adjacent the inlet of said housing includes a protrusion.

5. A dispenser according to claim 4, wherein each of the containers has a cylindrical sidewall of a predetermined diameter and when said receiving door is fully open, at its closest, the distance between the front wall of said receiving door and the protrusion of said passage is slightly greater than the predetermined diameter of the containers such that the containers can pass between the front face of said receiving door and the protrusion of said passage only in the predetermined orientation.

6. A dispenser according to claim 1, further comprising a gate disposed at the outlet of said housing, said gate being movable between a first position blocking the containers from exiting said housing and a second position allowing said containers to exit said housing through the outlet.

7. A dispenser according to claim 6, further comprising a container cradle disposed outside of said housing adjacent the outlet and interconnected with said gate, wherein when a container is disposed on said container cradle, said gate is held in the first position.

8. A dispenser according to claim 1, wherein said passage comprises a first ramp angled downwardly from the inlet toward the rear of said housing and a second ramp angled downwardly from the rear toward the outlet of said housing.

9. A dispenser according to claim 8, wherein at least one of said first and second ramps is canted downwardly from the first to the second side of said housing.

10. A dispenser according to claim 9, wherein the containers comprise bottles and keying means is provided at the inlet of said housing for permitting the bottles to be inserted only with their neck ends facing the first side of said housing.

11. A dispenser according to claim 8, wherein said passage further comprises a U-turn section between said first and second ramps.

12. A dispenser according to claim 11, wherein a central axis of said U-turn section is canted downwardly from the first to the second side of said housing.

13. A dispenser according to claim 11, wherein said U-turn section is a semi-circular shape and is formed contiguously with said second ramp.

14. A dispenser according to claim 13, wherein each of the containers has a cylindrical sidewall of a predetermined diameter, and at its closest, the distance between said first ramp and said U-turn section is slightly greater than the predetermined diameter.

15. A dispenser according to claim 13, wherein each of the containers has a cylindrical sidewall of a predetermined diameter, and a radius of curvature of said U-turn section is slightly greater than the predetermined diameter.

16. A dispenser for sequentially dispensing a plurality of containers, said dispenser comprising:
    a housing having a front, a rear, a top, a bottom, a first side and a second side, an inlet and an outlet for the containers being disposed on the front of said housing;
    a passage disposed within said housing for guiding the containers from the inlet to the outlet, said passage comprising at least one ramp having a downward slope for guiding the containers from the inlet to the outlet of said housing, wherein said at least one ramp is canted downwardly from the first to the second side of said housing to urge the containers toward the second side of said housing; and a receiving door connected to said housing for openably covering the inlet, said receiving door being movable between a closed position covering the inlet and an open position allowing the containers to be inserted into the inlet, wherein said receiving door includes a front face contoured to cooperate with said passage to guide the containers in a predetermined orientation upon insertion into the inlet.

17. A dispenser according to claim 16, wherein said front face of said receiving door is a concave shape.

18. A dispenser according to claim 16, wherein the containers comprise bottles and keying means is provided at the inlet of said housing for permitting the bottles to be inserted only with their neck ends facing the first side of said housing.

19. A dispenser according to claim 16, wherein said housing comprises locking means for interlocking with housings of adjacent dispensers.

20. A dispenser according to claim 16, wherein said front face of said receiving door is a concave shape and a surface of said passage adjacent the inlet of said housing includes a protrusion.

21. A dispenser according to claim 20, wherein each of the containers has a cylindrical sidewall of a predetermined diameter and when said receiving door is fully open the distance between the front wall of said receiving door and the protrusion of said passage is slightly greater than the predetermined diameter of the containers such that the containers can pass between the front face of said receiving door and the protrusion of said passage only in the predetermined orientation.

22. A dispenser according to claim 16, further comprising a gate disposed at the outlet of said housing, said gate being movable between a first position blocking the containers from exiting said housing and a second position allowing said containers to exit said housing through the outlet.

23. A dispenser according to claim 22, further comprising a container cradle disposed outside of said housing adjacent the outlet and interconnected with said gate, wherein when a container is disposed on said container cradle, said gate is held urged in the first position.

24. A dispenser according to claim 16, wherein said passage comprises two ramps and a U-turn section between said two ramps.

25. A dispenser according to claim 24, wherein a central axis of said U-turn section is canted downwardly from the first to the second side of said housing.

26. A dispenser according to claim 24, wherein said U-turn section is a semi-circular shape and is formed contiguously with one of said two ramps.

27. A dispenser according to claim 26, wherein each of the containers has a cylindrical sidewall of a predetermined diameter and, at its closest, the distance between the other of said ramps and said U-turn section is slightly greater than the predetermined diameter.

28. A dispenser according to claim 26, wherein each of the containers has a cylindrical sidewall of a predetermined diameter, and a radius of curvature of said U-turn section is slightly greater than the predetermined diameter.

29. A dispenser for sequentially dispensing a plurality of containers, said dispenser comprising:

a housing having a front, a rear, a top, a bottom, a first side and a second side, an inlet and an outlet for the containers being disposed on the front of said housing;

a first ramp disposed within said housing and angled downwardly from the inlet toward the rear of said housing;

a second ramp disposed within said housing and angled downwardly from the rear toward the outlet of said housing;

a U-turn section between said first and second ramps, said U-turn section being of a semi-circular shape and being formed contiguously with said second ramp, wherein each of the containers has a cylindrical sidewall of a predetermined diameter, a minimum distance between said first ramp and said U-turn section is slightly greater than the predetermined diameter, and at least one of said first and second ramps is canted downwardly from the first to the second side of said housing to urge the containers toward the second side of said housing; and a receiving door connected to said housing for openably covering the inlet, said receiving door being movable between a closed position covering the inlet and an open position allowing the containers to be inserted into the inlet, wherein said receiving door includes a front face contoured to cooperate with said first ramp to aid in urging the containers in a predetermined orientation upon insertion into the inlet.

30. A dispenser according to claim 29, wherein said front face of said receiving door is a concave shape.

31. A dispenser according to claim 29, wherein each of the containers has a cylindrical sidewall of a predetermined diameter, and at its closest, a radius of curvature of said U-turn section is slightly greater than the predetermined diameter of the containers.

32. A dispenser according to claim 29, wherein a central axis of said U-turn section is canted downwardly from the first to the second side of said housing.

33. A dispenser according to claim 29, wherein the containers comprise bottles and keying means is provided at the inlet of said housing for permitting the bottles to be inserted only with their neck ends facing the first side of said housing.

34. A dispenser according to claim 29, wherein said housing comprises locking means for interconnecting with adjacent housings of other dispensers.

35. A dispenser according to claim 29, wherein said front face of said receiving door is a concave shape and a surface of said first ramp adjacent the inlet of said housing includes a protrusion.

36. A dispenser according to claim 35, wherein each of the containers has a cylindrical sidewall of a predetermined diameter and when said receiving door is fully open the distance between the front wall of said receiving door and the protrusion of said first ramp is slightly greater than the predetermined diameter of the containers such that the containers can pass between the front face of said receiving door and the protrusion of said first ramp only in the predetermined orientation.

37. A dispenser according to claim 29, further comprising a gate disposed at the outlet of said housing, said gate being movable between a first position blocking the containers from exiting said housing and a second position allowing said containers to exit said housing through the outlet.

38. A dispenser according to claim 37, further comprising a container cradle disposed outside of said housing adjacent the outlet and interconnected with said gate, wherein when a container is disposed on said container cradle, said gate is held in the first position.

39. A dispenser for sequentially dispensing a plurality of containers, said dispenser comprising:

a housing having a front, a rear, a top, a bottom, a first side and a second side, an inlet and an outlet for the containers being disposed on the front of said housing;

a passage disposed within said housing for guiding the containers from the inlet to the outlet;

a gate disposed at the outlet of said housing, said gate being movable between a first position blocking the containers from exiting said housing and a second position allowing said containers to exit said housing through the outlet; and a container cradle disposed outside of said housing adjacent the outlet and interconnected with said gate, wherein when a container is disposed on said container cradle, the weight of the container holds said gate in the first position to prevent another container from moving onto said container cradle and when no container is present on said container cradle, said gate is not held in the first position to allow another container to exit the outlet onto said container cradle.

40. A dispenser according to claim 39, wherein said housing comprises locking means for interconnecting with adjacent housings of other dispensers.

41. A dispenser according to claim 39, wherein at least one of said first and second ramps is canted downwardly from the first to the second side of said housing.

42. A dispenser according to claim 41, wherein the containers comprise bottles and keying means is provided at the inlet of said housing for permitting the bottles to be inserted only with their neck ends facing the first side of said housing.

43. A dispenser according to claim 37, further comprising a receiving door connected to said housing for openably covering the inlet, said receiving door being movable between a closed position covering the inlet and an open position allowing the containers to be inserted into the inlet, wherein said receiving door includes a front face contoured to cooperate with said passage to guide the containers in a predetermined orientation upon insertion into the inlet.

44. A dispenser according to claim 43, wherein said front face of said receiving door is a concave shape.

45. A dispenser according to claim 43, wherein said front face of said receiving door is a concave shape and a surface of said passage adjacent the inlet of said housing includes a protrusion.

46. A dispenser according to claim 45, wherein each of the containers has a cylindrical sidewall of a predetermined diameter and when said receiving door is fully open, at its closest, the distance between the front wall of said receiving door and the protrusion of said passage is slightly greater than the predetermined diameter of the containers such that the containers can pass between the front face of said receiving door and the protrusion of said passage only in the predetermined orientation.

47. A dispenser according to claim 39, wherein said passage comprises a first ramp angled downwardly from the inlet toward the rear of said housing and a second ramp angled downwardly from the rear toward the outlet of said housing.

48. A dispenser according to claim 47, wherein said passage further comprises a U-turn section between said first and second ramps.

49. A dispenser according to claim 48, wherein a central axis of said U-turn section is canted downwardly from the first to the second side of said housing.

50. A dispenser according to claim 48, wherein said U-turn section is a semi-circular shape and is formed contiguously with said second ramp.

51. A dispenser according to claim 50, wherein each of the containers has a cylindrical sidewall of a predetermined diameter, and at its closest, the distance between said first ramp and said U-turn section is slightly greater than the predetermined diameter.

52. A dispenser according to claim 50, wherein each of the containers has a cylindrical sidewall of a predetermined diameter, and a radius of curvature of said U-turn section is slightly greater than the predetermined diameter.

53. A dispenser for sequentially dispensing a plurality of containers, said dispenser comprising:

a housing having a front, a rear, a top, a bottom, a first side and a second side, an inlet and an outlet for the containers being disposed on the front of said housing;

a passage disposed within said housing for guiding the containers from the inlet to the outlet; and receiving means connected to said housing for receiving containers through the inlet and guiding the containers in a predetermined orientation upon insertion into the inlet, wherein said receiving means comprises a front surface of a door openably covering the inlet and a contoured surface of said passage adjacent the inlet.

54. A dispenser according to claim 53, wherein each of the containers includes a cylindrical sidewall and in the predetermined orientation the longitudinal axes of the containers are substantially orthogonal to a direction of conveyance of said passage.

55. A dispenser for sequentially dispensing a plurality of containers, said dispenser comprising:

a housing having a front, a rear, a top, a bottom, a first side and a second side, an inlet and an outlet for the containers being disposed on the front of said housing;

a passage disposed within said housing for guiding the containers from the inlet to the outlet;

guiding means within said housing for maintaining the containers in a predetermined orientation while the containers move along said passage from the inlet to the outlet; and receiving means connected to said housing for receiving containers through the inlet and guiding the containers in the predetermined orientation upon insertion into the inlet, wherein said receiving means comprises a front surface of a door openably covering the inlet and a contoured surface of said passage adjacent the inlet.

56. A dispenser according to claim 55, wherein said guiding means comprises a canted surface of said passage at a downward angle from the first side to the second side of said housing.

57. A dispenser according to claim 55, wherein each of the containers includes a cylindrical sidewall and in the predetermined orientation the longitudinal axes of the containers are substantially orthogonal to a direction of conveyance of said passage.

* * * * *